US009545867B2

(12) United States Patent
Melancon, Jr.

(10) Patent No.: US 9,545,867 B2
(45) Date of Patent: Jan. 17, 2017

(54) RAMP WALL OPERATING ARRANGEMENT

(71) Applicant: Dennis Wayne Melancon, Jr., Lynchburg, VA (US)

(72) Inventor: Dennis Wayne Melancon, Jr., Lynchburg, VA (US)

(73) Assignee: Dropstor, Inc., Lynchburg, VA (US)

( * ) Notice: Subject to any disclaimer, the term of this patent is extended or adjusted under 35 U.S.C. 154(b) by 0 days.

(21) Appl. No.: 14/672,209

(22) Filed: Mar. 29, 2015

(65) Prior Publication Data

US 2016/0280115 A1    Sep. 29, 2016

(51) Int. Cl.
*B60P 1/43* (2006.01)
*B65G 69/28* (2006.01)
*B65D 88/54* (2006.01)

(52) U.S. Cl.
CPC ............. *B60P 1/435* (2013.01); *B65D 88/542* (2013.01); *B65G 69/28* (2013.01)

(58) Field of Classification Search
CPC .... B60D 1/544; B60D 2001/544; B60P 1/435; B65D 88/542; B65D 90/16
See application file for complete search history.

(56) References Cited

U.S. PATENT DOCUMENTS

| | | | |
|---|---|---|---|
| 5,743,701 A | 4/1998 | Green | |
| 6,068,324 A * | 5/2000 | DeKlotz | B60P 1/435 296/10 |
| 6,102,646 A * | 8/2000 | Bass | B60P 1/435 296/57.1 |
| 7,121,288 B2 | 10/2006 | Jenkins | |
| 7,717,290 B2 | 5/2010 | Gerding | |
| 7,819,270 B1 | 10/2010 | Hughes | |
| 8,043,043 B2 | 10/2011 | Collins | |
| 8,840,354 B2 * | 9/2014 | Melancon, Jr. | B65D 88/542 414/537 |
| 9,067,524 B2 * | 6/2015 | Melancon, Jr. | B60P 1/286 |
| 2004/0052625 A1 * | 3/2004 | Butterfield | B60P 1/435 414/537 |
| 2005/0031437 A1 * | 2/2005 | Doose | B60P 1/6463 414/467 |
| 2007/0231114 A1 * | 10/2007 | Westrate | B60P 1/435 414/545 |
| 2009/0064428 A1 * | 3/2009 | Hoffman | B65D 88/542 14/71.1 |
| 2012/0213621 A1 * | 8/2012 | Bass | B60P 1/435 414/469 |

* cited by examiner

Primary Examiner — James Keenan
(74) Attorney, Agent, or Firm — Lawrence E. Laubscher, Sr.; Lawrence E. Laubscher, Jr.; Robert D. Spendlove

(57) ABSTRACT

A storage container for bulk materials includes a rectangular bin containing a an open-ended chamber having a horizontal bottom wall, a pair of vertical side walls and a vertical rear wall, and a pair of parallel spaced centrally-arranged horizontal guide rails that extend longitudinally below the bin, which guide rails have forward end portions that extend outwardly beyond the bin front end. A ramp wall is pivotally connected with the forward end of the bin for displacement between a vertical first position closing the forward end of the chamber, and a downwardly inclined ramp position. A piston and cylinder motor arrangement is connected between the guide rail ends and the ramp wall for displacing the ramp wall between its vertical first and downwardly inclined second positions. The chamber side walls are spaced so that a front end loader can travel up the downwardly inclined ramp and into the chamber.

4 Claims, 6 Drawing Sheets

PRIOR ART

RAMP WALL OPERATING ARRANGEMENT

REFERENCE TO RELATED APPLICATIONS

This application is a companion application to the earlier Melancon applications Ser. No. 13/278,376 filed Oct. 21, 2011 entitled "Container Having a Downwardly Pivotable Ramp Wall, and Method", and Ser. No. 13/655,293 filed Oct. 18, 2012, entitled "Retractable Hook for Roll-Off Containers", published Apr. 24, 2014 (now U.S. Pat. No. 8,840,354 issued Sep. 23, 2014).

BACKGROUND OF THE INVENTION

Field of the Invention

A storage container includes a rectangular bin containing an open-ended chamber having a horizontal bottom wall, a pair of vertical side walls and a vertical rear wall, and a pair of parallel spaced horizontal centrally-arranged guide rails that extend longitudinally below the bin, which guide rails have forward end portions that extend outwardly beyond the front end of the bin. A motor arrangement connected at one end with the forwardly protruding ends of the guide rails displaces a pivotally connected ramp wall between a vertical first position closing the front end of the chamber, and a downwardly inclined loading and unloading position.

Description of Related Art

Storage containers for delivering bulk material, landscaping material, and the like to a site, and for collecting waste at a site, are well known in the prior art, as shown by the patents to Collins U.S. Pat. No. 8,043,043 and Green U.S. Pat. No. 5,743,701, and a ramp arrangement for containers is shown in the Jenkins U.S. Pat. No. 7,121,288. A storage container with a pair of swinging doors is shown in the Straka U.S. Pat. No. 6,910,574. Collapsible and sectional shipping and storage containers are shown by the patents to Csumrik U.S. Pat. No. 3,809,278 and Roberts U.S. Pat. No. 5,192,176.

In the prior Hughes U.S. Pat. No. 7,819,270, a telescoping material handling bin is disclosed wherein a ramp end wall is pivoted downwardly to permit a loading/unloading vehicle to be driven up the ramp for engagement with the bulk material contained in the bin.

One problem that occurs during the use of such known bulk material handling and storage bins is that of connecting an operating motor arrangement to the container in such a manner that it will operate a relatively heavy container component, such as a pivotally connected ramp wall, in a positive durable manner without interfering with the handling of the container, or the operation of container components (such as access doors and the like). Initially it was proposed to connect the motor means for operating a container ramp wall between the adjacent vertical edge portions of the ramp wall and the container side walls. The present invention was developed to avoid these and other disadvantages of the prior art devices.

SUMMARY OF THE INVENTION

Accordingly, a primary object of the present invention is to provide a storage container for bulk materials including an improved motor arrangement for pivoting a ramp wall between a vertical position closing the open front end front end of a storage chamber, and a downwardly inclined loading and unloading position.

A more specific object of the invention is to provide a storage container including an open-ended rectangular bin; a pair of centrally-arranged parallel spaced guide rails that extend longitudinally beneath the storage bin, which guide rails have end portions that extend beyond the front end of the bin; and a ramp wall pivotally connected with the forward end of the bin for displacement between a vertical first position closing the forward end of the chamber, and a downwardly inclined ramp position. According to the present invention a piston and cylinder motor arrangement is connected between the guide beam ends and the ramp wall for displacing the ramp wall between a vertical first position closing the open end of the bin, and a downwardly-inclined loading and unloading second position.

According to a further object, the side walls of the bin are so spaced that a front end loader can travel up the downwardly inclined ramp and into the chamber for engagement with the bulk landscaping material, and down the inclined ramp wall to discharge the material at the work site.

Another object of the invention is to provide a storage container arrangement wherein the lower ends of the piston and cylinder motors are pivotally connected with the remote outer surfaces of the protruding guide rail end portions, and the upper ends of the motors are pivotally connected with a horizontal pivot bar mounted on the outer surface of the ramp wall. A pivotal tow hook assembly is connected with the front of the container by means of a support plate that is secured in bridging relation across the upper surfaces of the guide rail protruding end portions.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
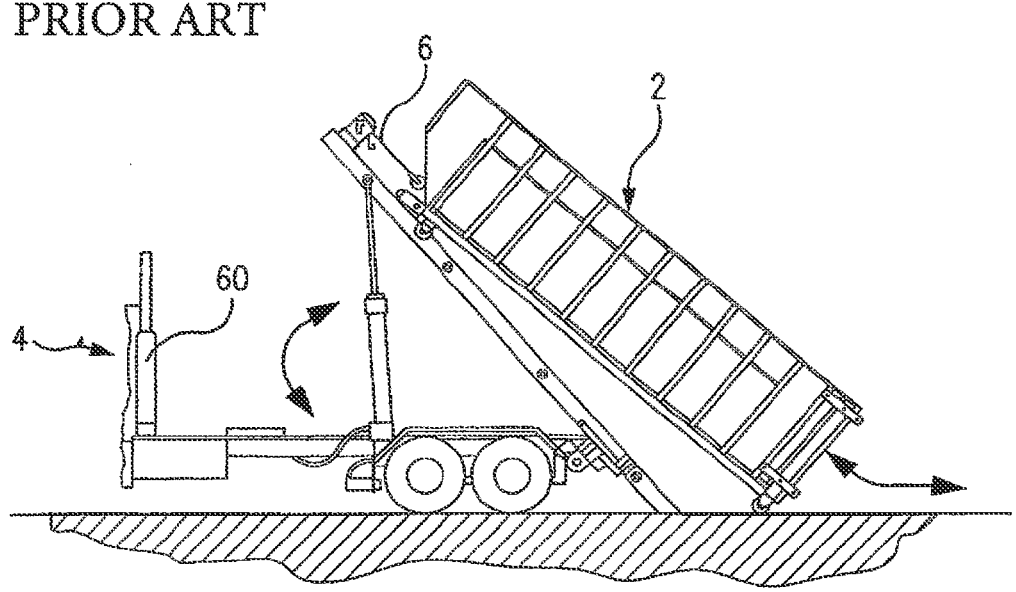
FIG. 1 illustrates the conventional tilt bed truck means for transporting a storage container to a desired work site.

Referring first more particularly to FIG. 1, the rectangular storage container 2 for bulk material, landscaping material, waste material and the like is generally transported to a desired site by a tilt-type flatbed trailer 4. A cable 6 is used for loading the container on, and unloading the container from, the tilting trailer bed. Customarily, the cable 6 has a hook that is adapted for connection with a bar on the container, such as the bars 41 and 42 on the prior storage container of FIGS. 2 and 3. Alternatively, the cable includes a tow loop that is adapted for connection with a hook member on the container, as will be described below with reference to FIG. 4. In accordance with the present invention, the tow hook member is designed for pivotal displacement between an operable extended position, and a retracted non-obstructing position, thereby to permit a hingedly connected ramp wall to be downwardly displaced toward an inclined loading position relative to ground.

Figure 2:
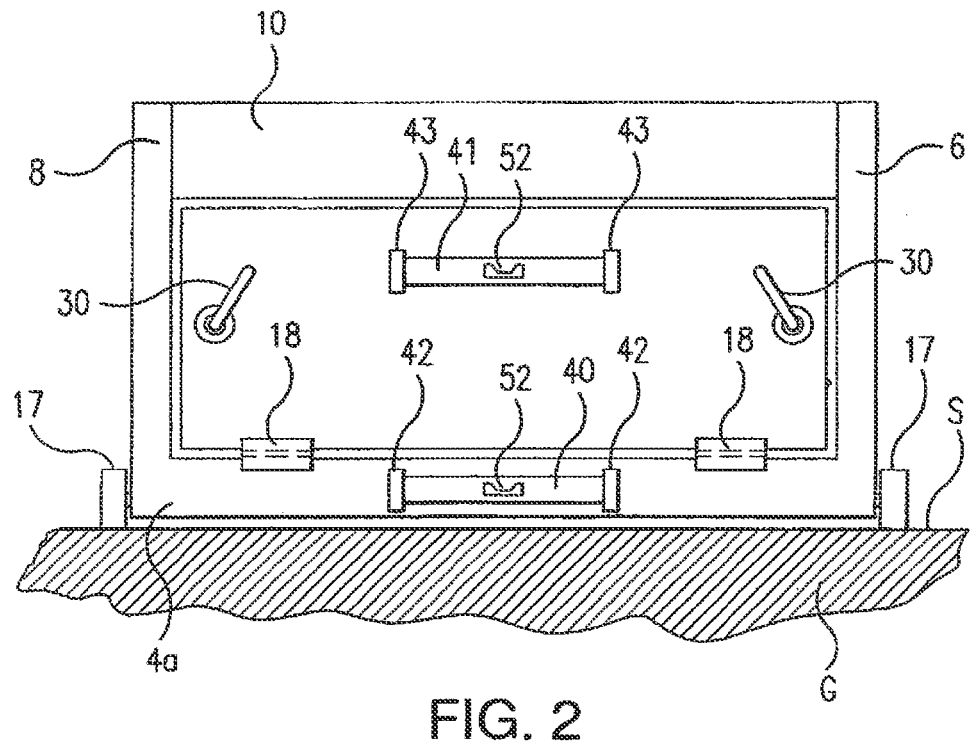
FIGS. 2 and 3 are rear elevation and detailed side views of a prior embodiment of the invention adapted for use with a hook-type towing cable.
Figure 3:
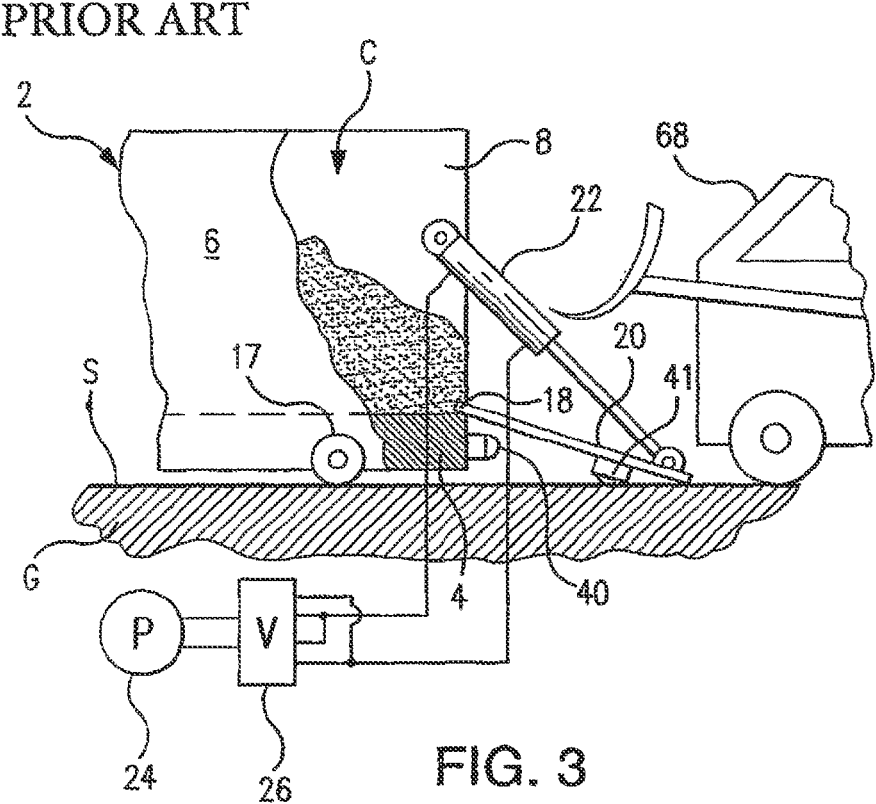

Briefly, in the prior container of FIGS. 2 and 3, which is the subject of the prior Melancon application Ser. No. 13/278,376, the storage container 2 includes a bottom wall 4 supported by rollers 17, a pair of side walls 6 and 8, an end wall 10, and a ramp wall 20 that is hingedly connected with the container by hinge means 18. The ramp wall is displaceable from the vertical position of FIG. 2 to the inclined loading position of FIG. 3, thereby to permit a front-end-loading vehicle 68 to drive up the ramp wall to remove landscaping materials and the like from the storage chamber C. Hydraulic motor means 22, 24 and 26 are operable to raise and lower the ramp wall, and locking means 30 serve to lock the ramp wall to the container.

In this prior invention, there are provided a pair of transport bars 40 and 41 that are rigidly connected with the container frame and with the ramp wall, respectively, thereby to permit the container to be transported as a result of the engagement between a hook on the end of the towing cable 6 and a selected one of the towing bars 40 and 41.

Figure 4:
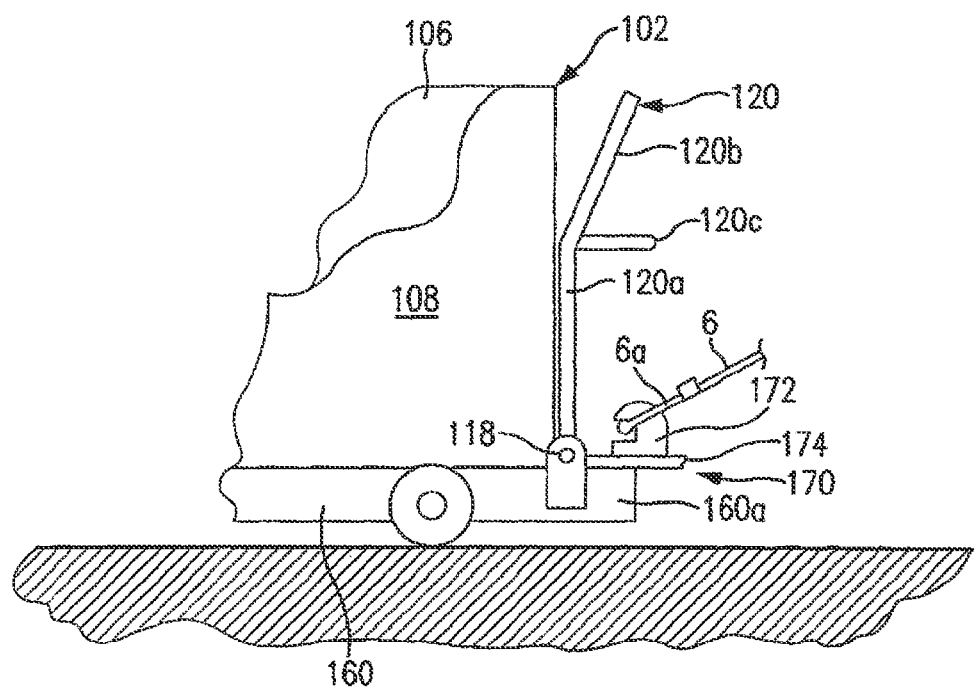
FIG. 4 is a detailed view of a first ramp wall embodiment of the present invention adapted for use with a loop-type towing cable, with the ramp wall in the vertical closed position, and the tow hook member in the upwardly extended towing position.
Figure 5:
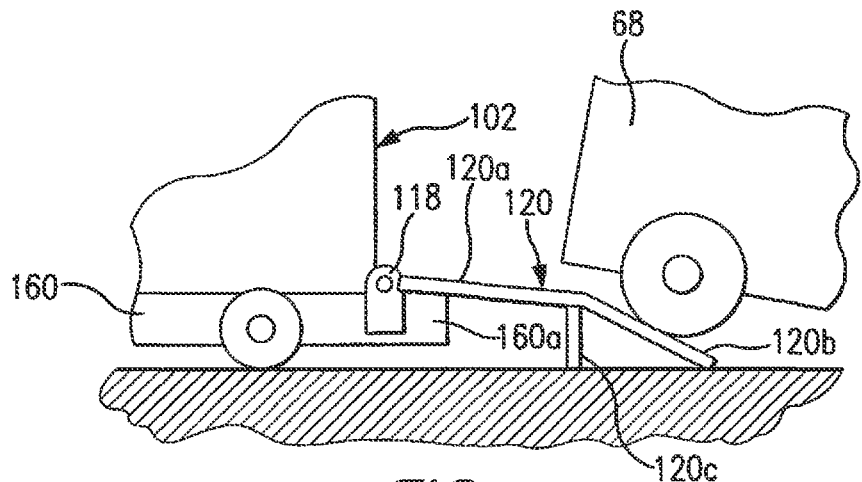
FIG. 5 illustrates the apparatus of FIG. 4 with the ramp wall in the downwardly inclined loading position, the tow hook member being concealed in the non-obstructing retracted position.

Referring now to FIGS. 3 and 4, in h a first embodiment of the present invention, the storage container 102 includes a rectangular ramp wall 120 that is hingedly connected at its lower edge with the container by hinge means 118, thereby to permit hinged displacement of the ramp wall between the vertical position of FIG. 4, and the inclined loading position of FIG. 5. As shown in FIG. 4, the ramp wall 120 has a generally vertical lower first section 120a, and an upper second section 120b that extends outwardly of the container at an obtuse angle relative to the lower first section. The ramp wall is provided with rigid foot means 120c that support the central portion of the ramp wall when the ramp wall is in the inclined loading position of FIG. 5.

As will be explained in greater detail below, the container 102 includes a pair of parallel spaced base beams or guide rails 160 that extend longitudinally beneath the container bottom wall. These guide rails include end portions 160a that protrude longitudinally outwardly beyond the ramp wall 120. In accordance with a characterizing feature of the present invention, a pivotal hook assembly 170 is mounted on the upper surfaces of the guide rail end portions, thereby to provide means for connecting the loop portion 6a of a tow cable 6 with the container. The pivotal assembly includes a hook member 172 that is pivotally connected with a metal support plate 174 that is welded to the upper surfaces of the guide rail ends 160a. In order to prevent interference with the ramp wall during the lowering thereof from the vertical position of FIG. 4 to the inclined loading position of FIG. 5, the hook member 172 is pivotally displaceable relative to the support plate 172 from the extended vertical transport position of FIG. 4 toward the concealed retracted position of FIG. 5.

Figure 6:
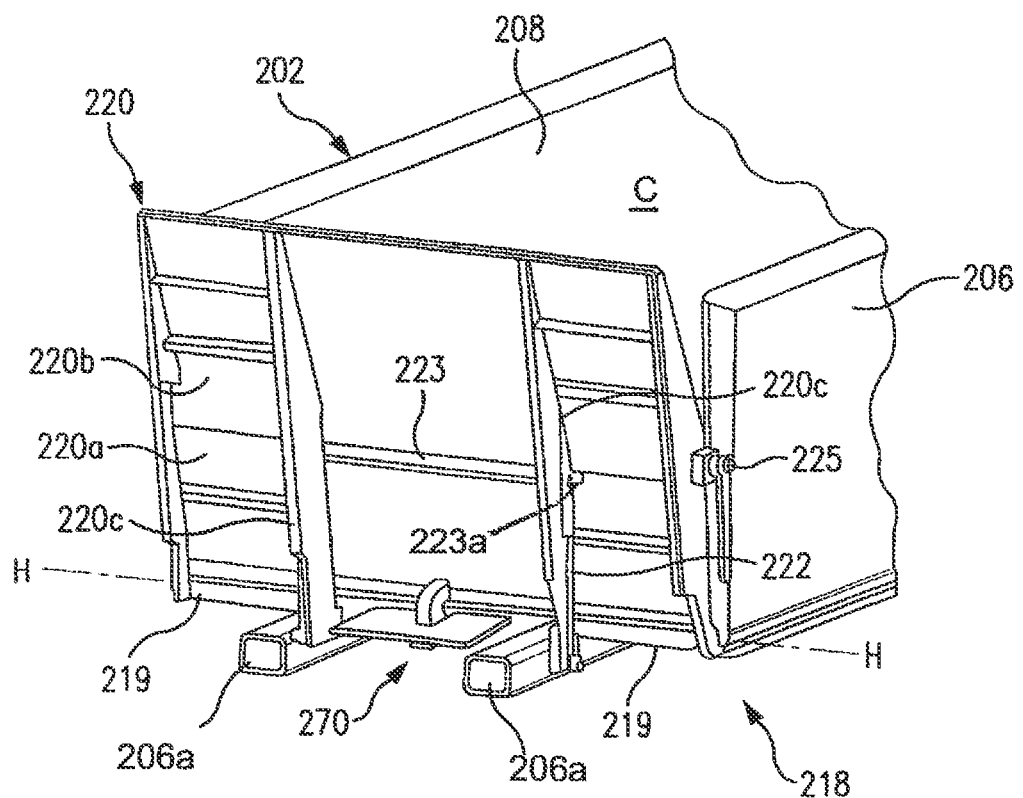
FIG. 6 is a detailed partially-exploded perspective view of a second ramp wall embodiment according to the present invention when in the vertical position, and with the pivotal hook member in the upwardly extended position.
Figure 7:
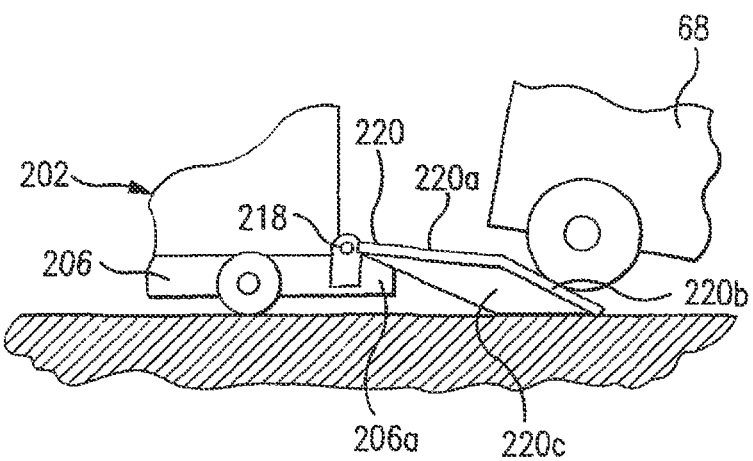
FIG. 7 is a detailed side elevation view of the apparatus of FIG. 6 with the ramp wall in the downwardly-inclined loading position, the tow hook member being concealed in the non-obstructing retracted position.
Figure 8:
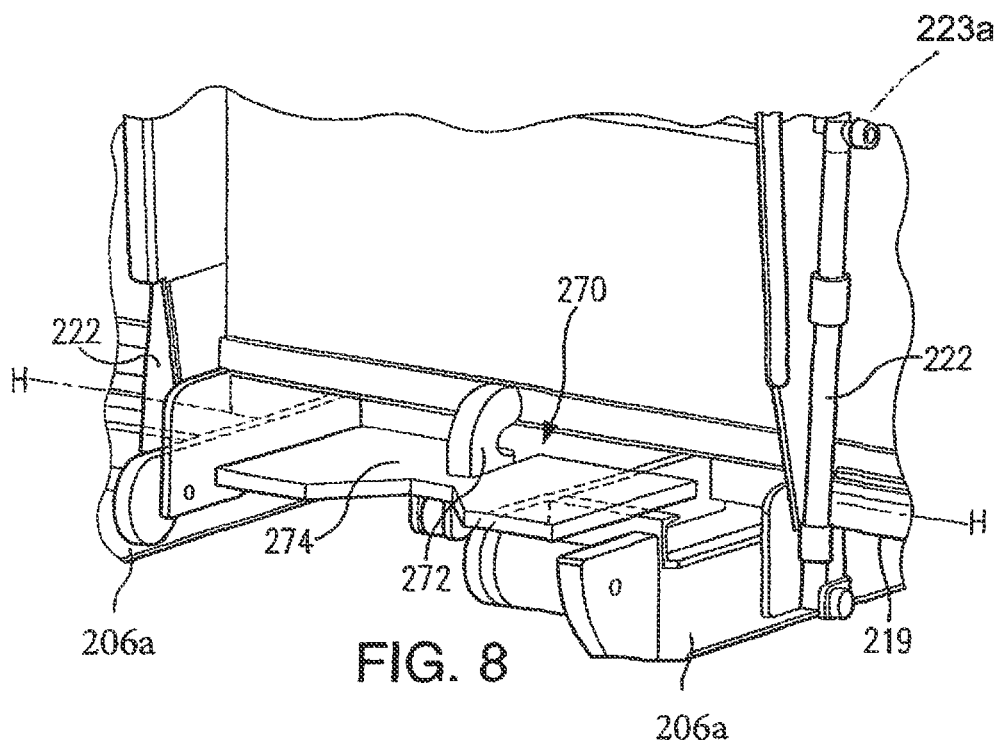
FIG. 8 is a detailed perspective view of the apparatus of FIG. 6.
Figure 9:
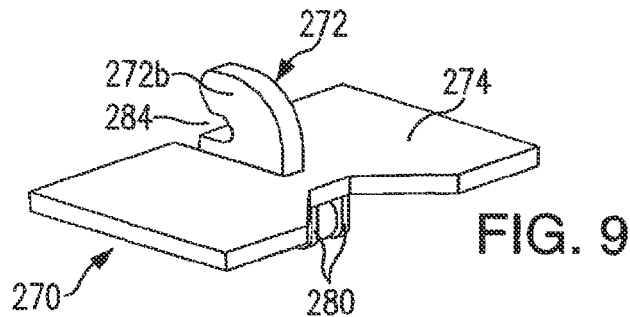
FIG. 9 is a perspective view of the pivotal gravity-biased embodiment of the tow hook apparatus.

In the preferred embodiment of FIGS. 6-8, in accordance with the present invention, the storage container 202 includes a pair of parallel spaced longitudinally-extending guide rails 206 having end portions 206a that extend outwardly beyond the ramp wall 220, the pivotal hook assembly 270 including a support plate 274 that is welded to the upper surfaces of the guide rails, and a pivotally connected hook member 272. The ramp wall 220 of this embodiment is reinforced by support flanges 220c that extend normal to the ramp wall hinge axis H-H defined by the collinear longitudinally-spaced pivot shafts 219. These support flanges are secured to the external surfaces of the first and second ramp wall sections 220a and 220b. The support flanges support the intermediate portion of the ramp wall relative to the ground surface when the ramp wall is in the inclined loading position of FIG. 7. The two generally-vertical hydraulic piston and cylinder motor means 222 (FIG. 8) for raising and lowering the ramp wall 220 are pivotally connected at their lower ends with the outer remote surfaces of the guide rails, and at their upper ends with the ends 223a of a pivot bar 223 that is secured to the external surface of the ramp wall between the support flanges 220c. Fastening means 225 are provided for fastening the sides of the ramp wall to the adjacent ends of the container side walls.

Figure 10:
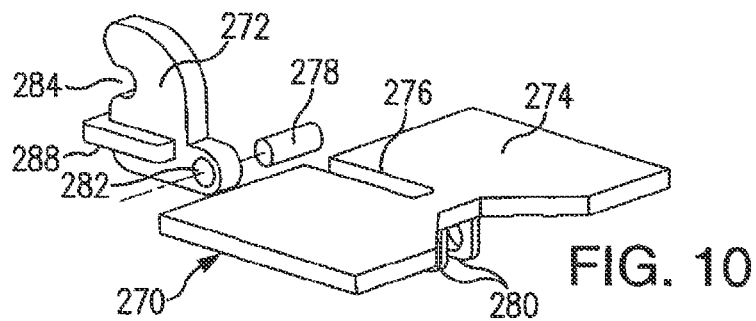
FIG. 10 is an exploded view of FIG. 9.
Figure 13:
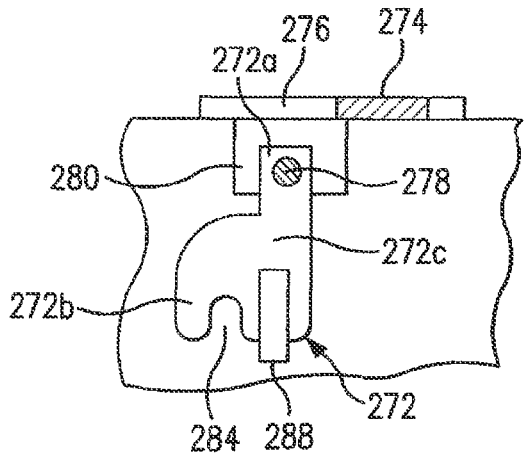
FIG. 13 is a sectional view taken along line 13-13 of FIG. 12.

Referring now to FIGS. 9-13, the horizontal planar rectangular support plate 274 is formed from a rigid metal material and includes a transverse edge portion that contains a slot 276 that extends in a vertical plane normal to the hinge axis H. Pivotally connected with the plate by a pivot pin 278 (FIG. 10) is the rigid metal hook member 272 that is pivotally displaceable between the normal gravity-biased concealed retracted position of FIGS. 12 and 13, and the upper extended position of FIGS. 9-11. The pivot pin 278 has ends that are supported within opposed openings contained in vertical parallel stanchion plates 280 that are parallel with, and arranged on opposite sides of, the slot 276, the upper ends of the stanchion plates being welded to the lower surface of the support plate 274. As best shown in FIGS. 10 and 13, the pivot pin 278 extends through an opening contained in one end 272a of the hook member, and the other end 272b of the hook member contains a recess 284. The hook member 272 may be manually pivoted upwardly from the non-obstructing retracted position of FIG. 13 toward the upwardly extended towing position of FIG. 9, whereupon the body portion 272c of the hook member is contained within the slot 276, and the second end portion 272b of the hook member extends upwardly above the upper surface of the support plate 274. In this case, the recess 284 is positioned above the support plate for connection with the tow loop of the tow cable 6 (as shown in FIG. 4).

Figure 11:
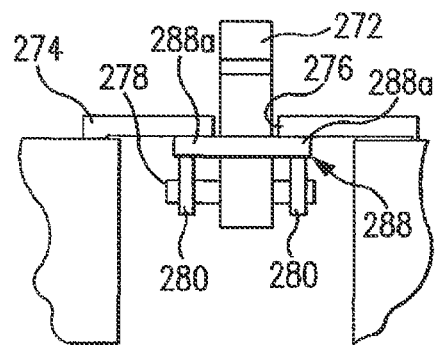
FIG. 11 is a detailed front elevation view of the tow hook assembly of FIG. 9 connected across the upper surfaces of the longitudinal center beams of the storage container, the hook member being in the upwardly extended position.
Figure 12:
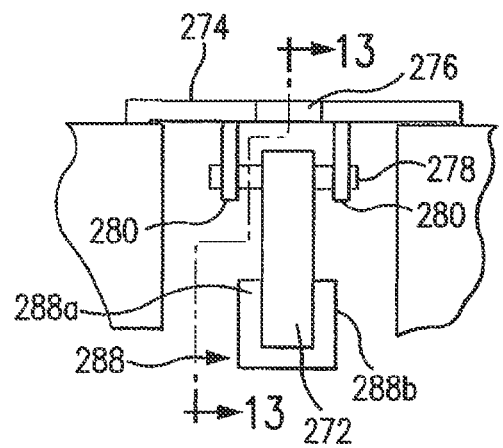
FIG. 12 is a front elevation view with the tow hook member in the non-obstructing retracted position.

In order to limit the extent of travel of the hook member 272, the hook member is provided with stop means 288 including a pair of laterally outwardly extending stop bars 288a that engage the lower surface of the support plate (as shown in FIG. 11) when the hook member is in the upwardly extended position. These stop means 288 may be in the form of a U-shaped component welded to the hook member (FIG. 12), or as a unitary stop plate secured within, and extending on opposite sides from, a corresponding slot contained in the hook member.

Figure 14:
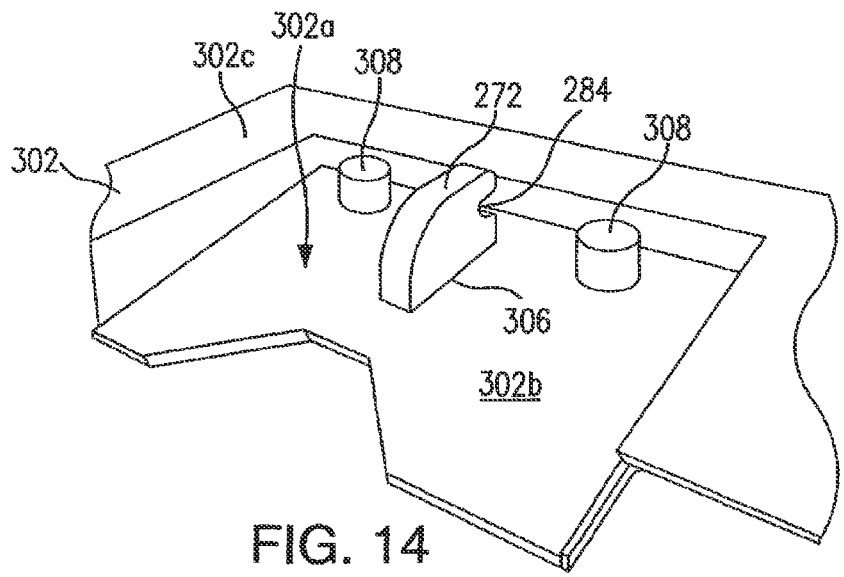
FIG. 14 is a perspective view of the preferred spring-biased embodiment of the invention.
Figure 15:
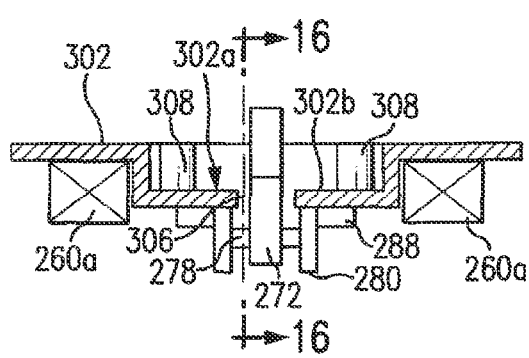
FIG. 15 is a transverse sectional view of the apparatus of FIG. 14.
Figure 16:
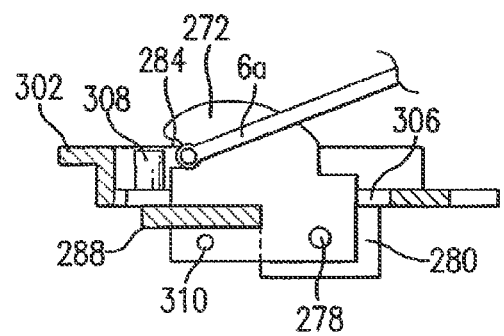
FIG. 16 is a sectional view taken along line 16-16 of FIG. 15.
Figure 17:
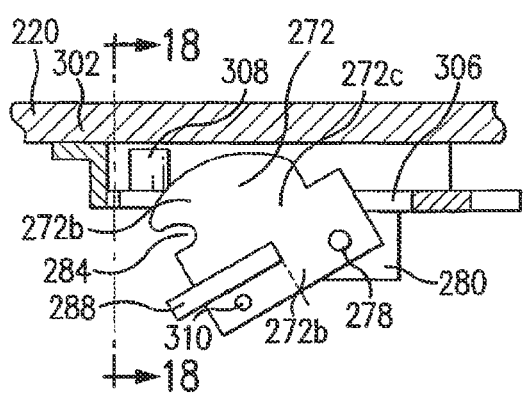
FIG. 17 is a sectional view illustrating the tow hook member of FIG. 16 in the retracted position.

Referring now to FIGS. 14-18, in accordance with the preferred embodiment of the invention, the tow hook member 272 is normally biased upwardly by spring means 300 (FIG. 18) toward the upwardly extended towing position shown in FIGS. 14-16, thereby to permit engagement of the towing cable loop with the recess 284 contained in the tow hook. In this embodiment, the support plate 302 contains a protective central recess 302a that extends downwardly between the support beams 260a of the container. The stanchion plates 280 are welded to the lower surface of the recess bottom wall 302b on opposite sides of the slot 306 contained in the recess bottom wall 302b. Protective metal pegs 308 are welded to the upper surface of the recess bottom wall 302b on opposite sides of the slot 306, which pegs terminate at their upper ends in end surfaces that are generally coplanar with the outer peripheral portion 302c of the support plate that is seated upon the container base beams 260a.

Figure 18:
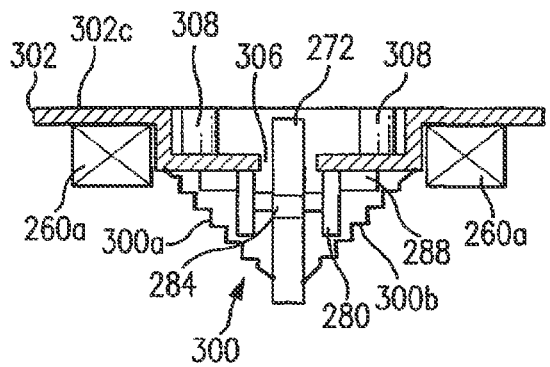
FIG. 18 is a sectional view taken along line 18-18 of FIG. 17.

A pair of tension springs 300a and 300b are provided having first ends connected with an opening 310 contained in the lower portion of the tow hook 272, and second ends connected with the bottom surface of the recess bottom wall 302b on opposite sides of the slot 306, respectively (as best shown in FIG. 18). These tension springs bias the tow hook pivotally upwardly toward the upwardly extended towing position of FIG. 16. When the container ramp wall 220 is pivoted downwardly toward the loading position of FIG. 7, the tow hook 272 of FIG. 16 is engaged by the ramp wall and is automatically pivoted downwardly against the restoring force of the tension springs 300b toward the non-obstructing retracted position of FIGS. 17 and 18. When the ramp wall is returned to its vertical position relative to the container body, the tow hook is return by the spring means 300 to the towing position of FIG. 16, It is important to note that although the retractable hook invention has been disclosed for use in connection with roll-off containers of the type including a downwardly pivotable ramp wall, it is apparent that the retractable hook invention, standing alone, could be used with all types of roll-off containers.

Furthermore, although the ramp wall has been illustrated as serving as an end wall for the storage container, it is apparent that, in addition to the ramp wall, a movable vertical end wall could be provided. In any event, when the ramp wall is in the inclined loading position and the adjacent end of the container is open, the front end loader may be driven up the ramp for entry into the storage container. The front end loader can be transported within the storage container when the storage container is transported by the flat bed truck 4. Moreover, although the hook member has been disclosed as being gravity-biased downwardly toward the non-obstructing retracted position, or spring-biased upwardly toward the upwardly extending towing position, it is apparent that the hook member could be mechanically displaced between its recessed and extended positions. Also, instead of a pivotally displaceable tow hook member, the tow member could be retractably displaceable by cam guide means, slide guide means, or the like.

While in accordance with the provisions of the Patent Statutes the preferred forms and embodiments of the invention have been illustrated and described, it will be apparent to those skilled in the art that changes may be made without deviating from the invention described above.

What is claimed is:

1. A storage container for transporting to, and storing bulk material at, a site on a ground surface (S), comprising:
    (a) a rectangular storage container (202) including:
        (1) a bin body having bottom, side and rear end walls defining-an open-topped chamber (C); and
        (2) a pair of parallel spaced centrally-arranged horizontal guide rails (260) extending longitudinally below said bin body, said guide rails having first end portions (260a) that extend forwardly beyond said bin body, each of said guide rails having a generally-rectangular hollow cross-section defining a pair of parallel spaced vertical sidewalls, and horizontal top and bottom walls, whereby the two guide rail first end portions include two outermost vertical side wall surfaces;
    (b) a rectangular vertical ramp wall (220) having a free horizontal upper edge, and a horizontal lower edge pivotally connected with said bin body front end for pivotal displacement about a horizontal pivot axis (218) arranged at a given height above the ground surface, said ramp wall being pivotally displaceable between:
        (1) a vertical first position at least partially closing said chamber front end, and
        (2) a downwardly inclined second position in which said free horizontal edge of said ramp wall engages the ground surface,
        (3) the width of said ramp wall and the spacing distance between said side walls being such that when said ramp wall is in said downwardly inclined second position, an unloading vehicle may be driven up said ramp wall for engagement with the bulk material contained within said chamber, and down said ramp wall to remove the bulk material from said chamber;
    (c) a motor arrangement connected between said guide rail forwardly extending first end portions and said ramp wall for displacing said ramp wall between said vertical first position and said downwardly inclined second position, said motor arrangement comprising a pair of generally-vertical piston and cylinder motors (222) arranged side-by-side and having lower ends pivotally connected with said two outermost vertical side wall surfaces of said guide rail forwardly extending first end portions, respectively, and upper ends pivotally connected with said ramp wall; and
    (d) a tow hook assembly (270) including a horizontal support plate (274) secured between said piston and cylinder motor lower ends in bridging relation across the top walls of said guide rail first end portions, and a tow hook member (272) connected with said support plate.

2. A storage container as defined in claim 1, wherein said ramp wall in said vertical position has an internal ramp surface, and an external surface that carries a horizontal pivot bar (223); and further wherein said piston and cylinder motors have upper ends that are pivotally connected with said pivot bar, respectively.

3. A storage container as defined in claim 2, wherein said ramp wall in said vertical position includes on it external surface a pair of vertical spaced support flanges (220*c*) that engage the ground when said ramp wall is in said downwardly inclined position, said pivot bar being connected between said support flanges.

4. A storage container as defined in claim 3, wherein said ramp wall in said vertical position includes a generally vertical lower section (220*a*), and an outwardly inclined upper section (220*b*).

* * * * *